United States Patent Office 3,642,647
Patented Feb. 15, 1972

3,642,647
PRODUCTION OF ANHYDROUS STANNIC CHLORIDE FROM AQUEOUS SOLUTION
Peter Derrick Goulden, Ancaster, Ontario, Canada, assignor to M & T Products of Canada Limited, Hamilton, Ontario, Canada
Filed Jan. 17, 1969, Ser. No. 791,994
Int. Cl. C01g 19/08
U.S. Cl. 252—182
9 Claims

ABSTRACT OF THE DISCLOSURE

A process for the dehydrating of aqueous solutions containing tetravalent tin and chloride ions by treatment thereof with sulfuric acid or oleum to form an upper phase containing sulfuric acid and a lower phase consisting of anhydrous stannic chloride and removing and recovering the lower phase as an anhydrous stannic chloride product.

BACKGROUND OF THE INVENTION

Stannic chloride or tin tetrachloride is a valuable tin chemical but it must be in the anhydrous form to be useful, e.g., in treating glass bottles and in preparation of organo-tins by Grignard synthesis. It has been necessary in the past, however, to prepare anhydrous stannic chloride by direct reaction of metallic tin and chlorine, partly because the complete dehydration of aqueous stannic chloride solutions has not until now been accomplished.

SUMMARY

In the method of the invention an aqueous solution containing tetravalent tin and chlorine in an oxidation number of −1 is mixed with sulfuric acid and/or a compound which in combination with water yields sulfuric acid to form an upper phase containing sulfuric acid and a lower phase consisting of anhydrous stannic chloride, separate from the upper phase. The lower phase is removed and recovered as an anhydrous stannic chloride product. The sulfuric acid and/or sulfuric acid producing compound is mixed with the aqueous solution in such proportions as to result in a sulfuric acid upper phase containing more than 84%, and advantageously at least about 90%, sulfuric acid by weight.

It is an object of the invention to provide a novel method for dehydrating aqueous solutions containing tin in tetravalent form and chlorine in an oxidation number of −1 to obtain anhydrous stannic chloride.

Other objects and advantages of the invention will be apparent from the description following taken in conjunction with the accompanying drawing.

DESCRIPTION OF THE PREFERRED EMBODIMENTS

In the method of the invention an aqueous solution containing tin in tetravalent form and chlorine in an oxidation number of −1 is mixed with at least one dehydrating material from the group comprising sulfuric acid and a compound which, combined with water, yields sulfuric acid, such as oleum (a solution of sulfur trioxide in sulfuric acid) or sulfur trioxide, in order to dehydrate the solution. The dehydrating material is mixed with the aqueous solution in such proportions as to result in an upper phase containing at least 84% sulfuric acid by weight. The resulting mixture is allowed to separate into an upper phase or layer and a lower phase or layer, the layers being distinctly separate. The upper phase contains sulfuric acid and the lower phase consists of anhydrous stannic chloride. The lower phase is removed, such as by drawing off or by decantation of the upper phase, and recovered as an anhydrous stannic chloride product.

The tetravalent tin solution being treated can be evaporated if desired or if necessary to a water content of between 20 and 25% by weight in order to avoid the necessity for removing excessive amounts of water by the dehydration treatment. Evaporation of water to less than about 20% results in evolution and loss of large amounts of stannic chloride along with the water.

Figure 1:
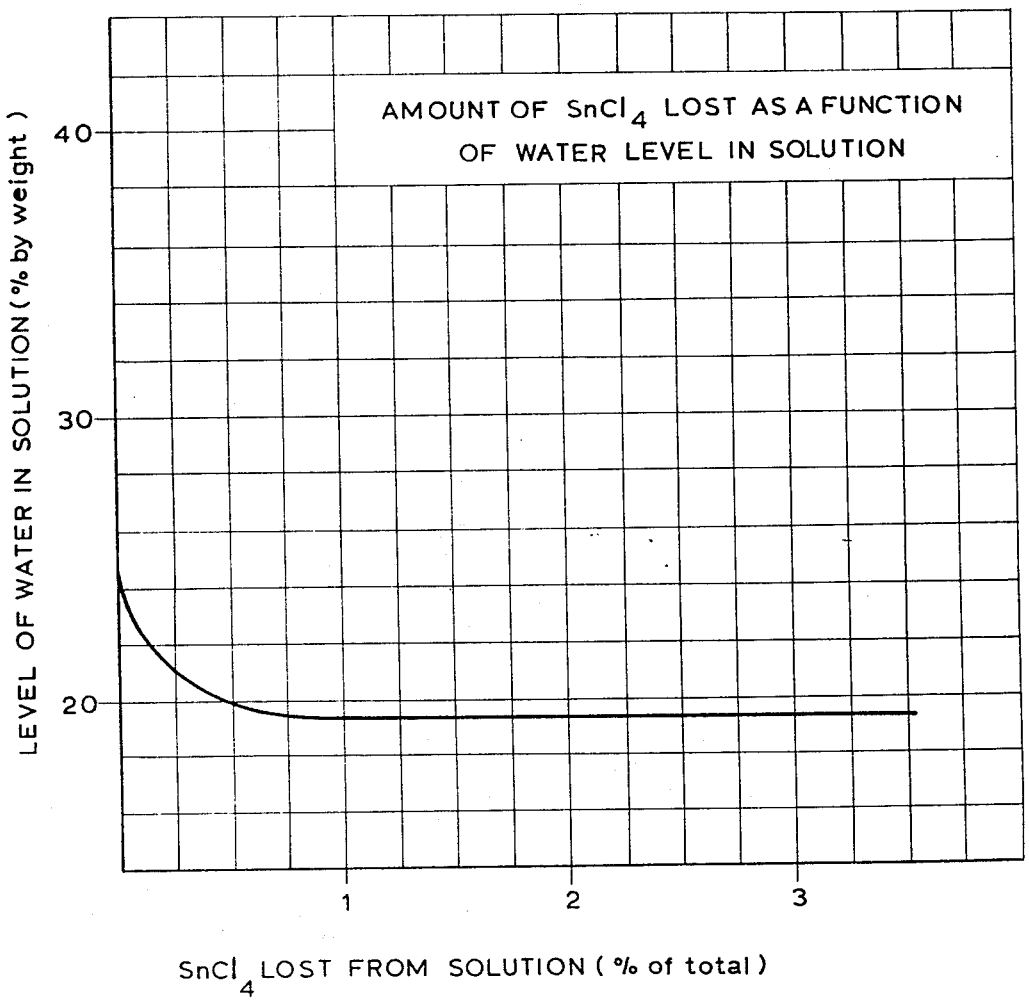
FIG. 1 shows a graph illustrating the loss of stannic chloride by evaporation from aqueous solutions containing varying proportions of water.

Thus, referring to FIG. 1 of the drawing, which is a graph prepared from experimental work carried out by the inventor and illustrating the loss of stannic chloride as water is evaporated from aqueous solutions containing varying water levels, it can be seen from the graph that an aqueous solution containing stannic chloride can be evaporated to reduce its water content down to a water level of about 25%, by weight before any stannic chloride also starts evaporating. The proportion of stannic chloride evaporating then increases as the water level of the solution falls below 25% by weight until at a water level of about 20% by weight the solution maintains a constant water content of 20% by weight and as much stannic chloride is evaporated as water.

Reference has been made to stannic chloride (tin tetrachloride) in solution in explaining FIG. 1 of the drawing and it is to be noted that any reference to stannic chloride in solution is not a commitment that the stannic chloride is necessarily present as such when in solution. There is considerable controversy as to the actual form of stannic chloride in solution and reference to stannic chloride or tin tetrachloride in solution herein is meant to include whatever form is taken by tetravalent tin and chlorine in an oxidation number of −1 together in aqueous solution, including those solutions containing such tin and chlorine in a ratio of at least 4 mols of chlorine for every 1 mol of tin, such as an actual solution containing 4 mols of chlorine for every 1 mol of tin (SnCl$_4$), and including hexachlorostannate solutions which can be treated by the present invention. It is to be further noted that the presence of certain contaminating ions, such as aluminium and iron, particularly in large amounts, interferes with the phase separation of the present process and treatment of such solutions as such is not meant to be included in the present process. Thus, such interfering contaminants must first be eliminated before treatment of an aqueous solution according to the present method is carried out.

Figure 2:
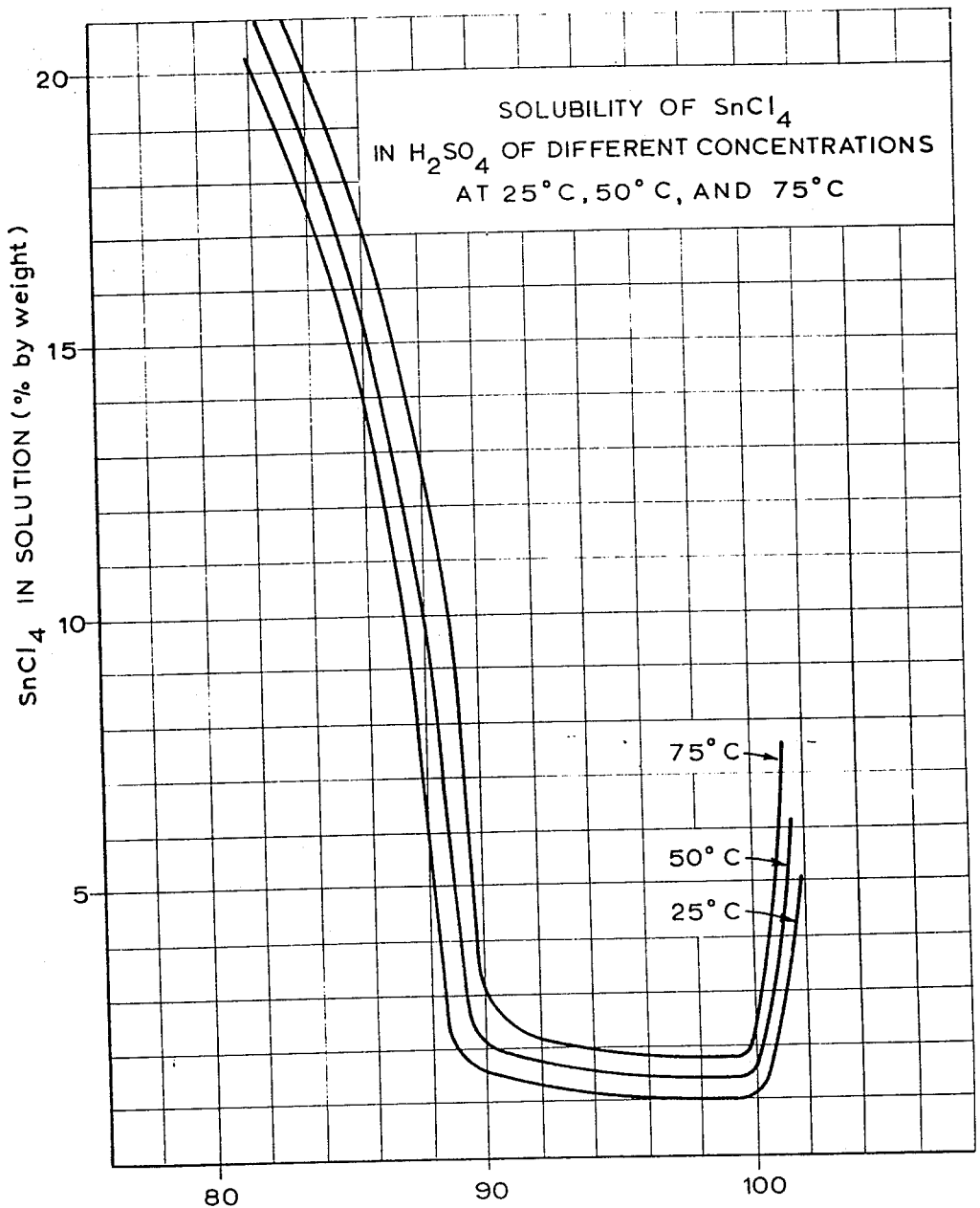
FIG. 2 shows a graph which illustrates the solubility of stannic chloride in sulfuric acid of varying strength at 25° C., 50° C., and 75° C.

By referring to the graph shown in FIG. 2 of the drawing, which is also prepared from experimental work carried out by the inventor, it can be seen that the solubility of stannic chloride at 25° C., 50° C. or 75° C. in a solution of sulfuric acid falls rapidly at above about 84% sulfuric acid until a sulfuric acid strength of about 90% is reached at which strength the solubility of SnCl$_4$ (between about 1½% and about 3% at this point) quickly levels off and reaches a minimum of between about 1% and about 2% at a sulfuric acid concentration of about 100%. It can be seen then that the dehydrating material comprising sulfuric acid and/or a compound yielding sulfuric acid, e.g. oleum or sulfur trioxide, is mixed with the aqueous solution of SnCl$_4$ in such proportions as to result in a sulfuric acid upper phase containing at least 84% sulfuric acid by weight. Preferably the proportions are such as to result in an upper phase containing at least about 90% sulfuric acid by weight, a range of between 90% and 100% sulfuric acid in the upper phase being most advantageous. Use of sulfur trioxide or oleum is seen to be most beneficial in keeping the sulfuric acid concentration of the final upper phase in the advantageous high range since the sulfur trioxide combines with water being removed to give sulfuric acid without any dilution effect.

As can be seen by the three curves of the graph of FIG. 2, too high an $SO_3$ content in the dehydrating material, with resulting sulfuric acid strength (including $SO_3$) in the upper phase of more than 100%, results in rapidly increasing loss of $SnCl_4$ because of the formation of troublesome complex compounds of $SnCl_4$ and $SO_3$, e.g.

$$SnCl_4(SO_3)_x$$

where $x$ has an undertermined value. Accordingly, it is preferably to control the make-up and proportions of the dehydrating material mixed with the aqueous so that the resulting upper phase contains no more than 100% sulfuric acid by weight.

The phase separation obtained in the process is very acute with substantially 100% separation of the phases being possible. Although the anhydrous $SnCl_4$ lower phase is most advantageously removed by merely drawing it off or by decanting the upper phase, it is possible to recover most of the anhydrous $SnCl_4$ by distillation from the sulfuric acid solution, with the $SnCl_4$ driven off then being collected.

For the purpose of giving those skilled in the art a better understanding of the invention the following illustrative examples are given.

EXAMPLE I

A solution of $SnCl_4$ in water, prepared by dissolution of 100 grams (g.) of stannic acid (containing 40% tin by analysis) in 135 g. of concentrated hydrochloric acid solution, was evaporated until the boiling temperature at atmospheric pressure was 145° C. The resulting concentrated solution contained 80% tin tetrachloride and 20% water by weight. To this solution was added 150 g. of 25% oleum (75% $H_2SO_4$ and 25% $SO_3$), with stirring and cooling, and the resulting mixture was allowed to stand for a few minutes. There was a very sharp separation into an upper and lower phase. The bottom layer was drawn off and was found to be anhydrous, liquid $SnCl_4$. 83 g. of $SnCl_4$ were recovered representing 95% of the original tin added. Analysis of the material showed a 45.4% tin content compared with 45.5% theoretical for $SnCl_4$. The upper layer remaining was a sulfuric acid solution containing 92% $H_2SO_4$, 1.4% $SnCl_4$ by weight and the water present in the $SnCl_4$ solution.

It is to be noted that anhydrous stannic chloride can be recovered from a solution of commercial sodium stannate by treating the solution with sulfuric acid to a pH of about 9 to first form stannic acid which precipitates and is filtered off and washed. The wet cake is then dissolved in hydrochloric acid to form $SnCl_4$ solution and this resulting solution is treated as in Example I to recover anhydrous stannic chloride therefrom.

EXAMPLE II

The procedures of Example 1 were repeated using what is known as "plant hydrate"—the stannic acid precipitated in the process used for recovering tin from tin plate. 120 g. of this "plant hydrate," which contained 36.4% tin, were dissolved in 147 g. of concentrated hydrochloric acid solution. The resulting solution was evaporated to a boiling temperature at atmospheric pressure of 146° C. The solution then analyzed 35.9% tin, corresponding to 79% $SnCl_4$ and 21% water. To this solution was added 172 g. of 25% oleum (75% $H_2SO_4$ and 25% $SO_3$), with stirring and cooling, and the mixture was allowed to stand at room temperature for a few minutes. Anhydrous, liquid stannic chloride separated out as a lower layer and was drawn off. 92.2 g. of $SnCl_4$ were recovered, representing 96% of the original tin. Analysis of the $SnCl_4$ showed a tin content of 45.5%, the theoretical value. The upper layer remaining consisted of 200 g. of 91% $H_2SO_4$ containing 1.6% stannic chloride by weight.

EXAMPLE III 120 g. of "plant hydrate" (referred to in Example II) containing 38.7% tin by analysis was dissolved in 157 g. of concentrated hydrochloric acid. The resulting solution was evaporated down until it contained 79.2% $SnCl_4$ and 20.8% water. To this solution was added 180 g. of 25% oleum (75% $H_2SO_4$ and 25% $SO_3$) with stirring and cooling. The cooling was controlled to maintain the temperature of the mix at 75 to 80° C. When oleum addition was completed stirring was stopped and the mixture separated into an upper and a lower phase. With the temperature still at 75 to 80° C., the bottom layer consisting of anhydrous tin tetrachloride was drawn off. The tin tetrachloride recovered weighed 98.3 g., representing 96.5% of the original tin. Analysis of the tin tetrachloride showed a tin content of 45.4%, compared with 45.5% theoretical. The upper phase or layer remaining consisted of 205 g. of 92% $H_2SO_4$ containing 2.4% $SnCl_4$ by weight.

EXAMPLE IV

A concentrated solution of $SnCl_4$ in water was prepared by evaporation of a dilute solution, as described in the previous examples. The concentrated solution contained 32.7% tin by analysis corresponding to a 72% solution of $SnCl_4$. 81 g. of the solution were taken and 69 g. of liquid $SO_3$ (a stabilized liquid $SO_3$ sold by Allied Chemical Ltd. under the trademark "Sulfan") were added slowly with cooling and agitation. The mixture was allowed to stand at room temperature and upper and lower layers separated out. The lower layer consisting of anhydrous liquid $SnCl_4$ was separated out and recovered. The recovered $SnCl_4$ weighed 55.9 g. and analysed 45.7% tin, compared with 45.5% theoretical. This recovery represented 97% of the tin in the original concentrated $SnCl_4$ solution treated. The upper layer remaining consisted of 92.8 g. of 91.8% $H_2SO_4$ containing 1.5% $SnCl_4$ by weight.

EXAMPLE V

To 79.4 g. of the concentrated $SnCl_4$ solution treated in Example IV was slowly added 178.6 g. of 99.9% $H_2SO_4$ with stirring and cooling. Upon completion of $H_2SO_4$ addition the mixture was cooled to room temperature and agitation was stopped. Distinct upper and lower layers formed and the lower layer consisting of anhydrous liquid $SnCl_4$ was removed. The $SnCl_4$ recovered weighed 53.4 g., representing 93% of the tin in the concentrated $SnCl_4$ solution, and analysed 45.3% tin, compared with 45.5% theoretical. The upper layer remaining consisted of 200.1 g. of 88.8% $H_2SO_4$ containing 2.0% $SnCl_4$.

EXAMPLE VI

To a tin tetrachloride solution containing 29.9 g. tin was added 34 g. of ammonium chloride as a hot 20% solution. The temperature of the mixed solutions was about 95° C. The resultant solution was cooled to about 15° C. and filtered. 112.6 g. of precipitate (ammonium hexachlorostannate) was recovered and 140.7 g. of filtrate containing 0.007% tin were collected. To 84.5 g. of the wet precipitate (which by analysis contained 22.4 g. of tin) were added 270 g. of 30% oleum (70% $H_2SO_4$, 30% $SO_3$) with stirring and cooling. There was separation into two liquid layers. The lower one, which was anhydrous tin tetrachloride, was drawn off and 43.4 g. of $SnCl_4$ were recovered, analysing 45.5% tin, the theoretical value for $SnCl_4$. This represented a recovery of 88% of the tin in the original tin tetrachloride solution as anhydrous tin tetrachloride. The upper layer remaining consisted of 289 g. of a solution of sulfuric acid (89.2% $H_2SO_4$) containing ammonium chloride and 0.9% tin.

EXAMPLE VII

To a tin tetrachloride solution containing 29.9 g. tin at 95° C. was added 471 g. of potassium chloride as a hot 20% solution. The mixed solution was cooled to about 15° C. and filtered. 104.4 g. of precipitate (potassium hexachlorostannate) was recovered. 95.5 g. of filtrate containing 0.9% tin remained. To 57.7 g. of the wet precipitate, containing 14.2 g. tin by analysis, was added 150 g. of 30% oleum. There was separation into two liquid layers and the lower one, which was anhydrous $SnCl_4$ was drawn off. 23.5 g. of anhydrous, liquid $SnCl_4$ containing 45.5% tin were recovered. This represented a recovery of 75% of the tin in the original tin tetrachloride solution. The upper layer consisted of 190 g. of a solution of sulfuric acid (87.5% $H_2SO_4$) containing potassium chloride and 2.85% tin.

EXAMPLE VIII

A solution of sodium stannate which contained 28.2 g. tin was treated by adding to it, at 95° C., 60 g. of barium chloride as a 20% solution. A precipitate of barium stannate formed and this was filtered off and 98.5 g. of this precipitate containing 28.1 g. tin were recovered. 930 g. of filtrate which contained 0.1 g. tin and any amphoteric metals such as zinc, aluminum, silicon which were present in the original sodium stannate solution remained. 50 g. of the barium stannate precipitate were dissolved in 125 g. of concentrated hydrochloric acid and 150 g. water. This solution was boiled and dilute sulfuric acid was added in excess to precipitate barium sulfate. The barium sulfate precipitate was filtered off and 29.4 g. of this precipitate containing 0.1 g. tin were collected. The solution remaining which contained $SnCl_4$ was boiled down until it contained approximately 70% $SnCl_4$. To this solution was added 100 g. of 30% oleum, with stirring and cooling. There was separation into two layers and the lower layer, which was anhydrous $SnCl_4$, was drawn off. 27.0 g. of $SnCl_4$ which by analysis contained 45.6% tin (compared with the theoretical value of 45.5%) was recovered. This represented a recovery as anhydrous $SnCl_4$ of 86% of the tin in the original stannate solution.

It can be seen that the present invention provides an easy and efficient method for producing anhydrous stannic chloride (tin tetrachloride) with very high recoveries of 95% and better being possible. The method of the invention involving the mere dehydration of an aqueous $SnCl_4$ solution, a procedure not previously successfully carried out in the art, is not only simple but also economical.

It is to be noted that a two phase mixture consisting of sulphuric acid and tin tetrachloride is a most advantageous mixture for tin tetrachloride handling purposes since the presence of the sulphuric acid overlying the tin tetrachloride ensures that the tin tetrachloride remains in the anhydrous form. Thus, moisture pick-up and fuming by the tin tetrachloride is avoided in handling such a mixture. The sulphuric acid phase in the two phase mixture should contain at least 84% by weight $H_2SO_4$, and preferably 90 to 100% by weight $H_2SO_4$, in order to avoid excessive dissolution of tin tetrachloride in the sulphuric acid phase as explained hereinbefore.

What I claim as my invention is:

1. A method for the treatment of an aqueous stannic chloride solution containing not less than about 20% water for recovery of anhydrous stannic chloride therefrom which comprises mixing with the aqueous solution at least one dehydrating material from the group consisting of sulfuric acid and a compound which in combination with water yields sulfuric acid, allowing the resultant mixture to separate into an upper phase containing not more than 100% sulfuric acid and a lower phase consisting of anhydrous stannic chloride and removing and recovering said lower phase from said upper phase as an anhydrous stannic chloride product, the dehydrating material being mixed with the aqueous solution in such proportions as to result in an upper phase containing at least 84% sulfuric acid by weight.

2. A method as claimed in claim 1 wherein the aqueous solution and the dehydrating material are mixed in such proportions as to result in an upper phase containing at least about 90% sulfuric acid by weight.

3. A method as claimed in claim 1 wherein the aqueous solution and the dehydrating material are mixed in such proportions as to result in an upper phase containing 90% to 100% sulfuric acid by weight.

4. A method as claimed in claim 1 wherein the aqueous solution contains between 20 and 25% by weight of water.

5. A method as claimed in claim 1 wherein the aqueous solution is mixed with at least one dehydrating material from the group comprising sulfuric acid and oleum.

6. A method as claimed in claim 5 wherein the aqueous solution is mixed with the dehydrating material in such proportions as to result in an upper phase containing 90 to 100% sulfuric acid by weight.

7. A method as claimed in claim 2 wherein the aqueous solution contains between 20 and 25% by weight of water and is mixed with at least one dehydrating material from the group comprising sulfuric acid and oleum in such proportions as to result in an upper phase containing 90 to 100% sulfuric acid by weight and the lower phase is removed and recovered by decantation of the upper phase therefrom.

8. A mixture for obtaining stannic chloride in anhydrous form, the combination which comprises sulfuric acid containing between about 84 and 100% by weight $H_2SO_4$, and tin tetrachloride, said mixture being in two phases with said sulfuric acid overlying said tin tetrachloride for avoiding moisture pick-up and fuming of said tin tetrachloride.

9. A mixture as claimed in claim 8 in which the sulfuric acid contains between about 90 and 100% by weight $H_2SO_4$.

References Cited
UNITED STATES PATENTS

| | | | |
|---|---|---|---|
| 2,047,545 | 7/1936 | Buttfield | 23—98 |
| 2,345,214 | 3/1944 | Pechukas | 23—98 |
| 2,346,604 | 4/1944 | Pechukas | 23—98 |

LEON D. ROSDOL, Primary Examiner

I. GLUCK, Assistant Examiner

U.S. Cl. X.R.

23—98, 312; 252—194